(12) United States Patent
Kramer et al.

(10) Patent No.: US 7,245,624 B2
(45) Date of Patent: Jul. 17, 2007

(54) PROCESSOR WITH TABLE-BASED SCHEDULING USING SOFTWARE-CONTROLLED INTERVAL COMPUTATION

(75) Inventors: David B. Kramer, Austin, TX (US); David P. Sonnier, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 1035 days.

(21) Appl. No.: 10/085,222

(22) Filed: Feb. 28, 2002

(65) Prior Publication Data

US 2003/0161317 A1 Aug. 28, 2003

(51) Int. Cl.
  *H04L 12/56* (2006.01)
(52) U.S. Cl. .................. 370/395.4; 370/411
(58) Field of Classification Search ........... 370/230, 370/352, 389, 395.4, 395.41, 395.42, 395.43, 370/397, 411, 412, 347, 445
See application file for complete search history.

(56) References Cited

U.S. PATENT DOCUMENTS

| | | | |
|---|---|---|---|
| 5,694,554 A | 12/1997 | Kawabata et al. | |
| 5,712,851 A | 1/1998 | Nguyen et al. | |
| 5,889,763 A * | 3/1999 | Boland et al. | 370/235 |
| 6,011,775 A * | 1/2000 | Bonomi et al. | 370/230 |
| 6,011,798 A | 1/2000 | McAlpine | |
| 6,374,405 B1 * | 4/2002 | Willard | 725/94 |
| 6,377,583 B1 | 4/2002 | Lyles et al. | |
| 6,389,019 B1 * | 5/2002 | Fan et al. | 370/395.42 |
| 6,414,963 B1 * | 7/2002 | Gemar | 370/412 |
| 6,477,144 B1 | 11/2002 | Morris et al. | |
| 6,526,062 B1 * | 2/2003 | Milliken et al. | 370/395.42 |
| 6,535,512 B1 | 3/2003 | Daniel et al. | |
| 6,603,766 B1 | 8/2003 | Zifroni et al. | |
| 6,661,774 B1 | 12/2003 | Lauffenburger et al. | |
| 6,667,977 B1 * | 12/2003 | Ono | 370/392 |
| 6,721,325 B1 | 4/2004 | Duckering et al. | |
| 6,735,207 B1 | 5/2004 | Prasad et al. | |
| 2002/0080721 A1 | 6/2002 | Tobagi et al. | |
| 2002/0122403 A1 | 9/2002 | Hashem et al. | |
| 2002/0142780 A1 | 10/2002 | Airy et al. | |
| 2002/0159411 A1 * | 10/2002 | Airy et al. | 370/330 |
| 2003/0021228 A1 | 1/2003 | Nakano et al. | |
| 2003/0046414 A1 | 3/2003 | Pettyjohn et al. | |
| 2003/0081624 A1 | 5/2003 | Aggarwal et al. | |
| 2005/0050543 A1 | 3/2005 | Ogus et al. | |

* cited by examiner

*Primary Examiner*—Chi Pham
*Assistant Examiner*—Saba Tsegaye (57) ABSTRACT

A processor includes scheduling circuitry and an associated interval computation element. The scheduling circuitry schedules data blocks for transmission from a plurality of transmission elements, and is configured for utilization of at least one time slot table in scheduling the data blocks for transmission. The interval computation element, which may be implemented as a script processor, is operative to determine an interval for transmission of one or more data blocks associated with corresponding locations in the time slot table. The transmission interval is adjustable under control of the interval computation element so as to facilitate the maintenance of a desired service level for one or more of the transmission elements. The interval computation element operates under software control in at least one of determining and adjusting the transmission interval, and may be operative to determine periodically if the transmission interval requires adjustment in order to maintain the desired service level for one or more of the transmission elements.

21 Claims, 5 Drawing Sheets

PROCESSOR WITH TABLE-BASED SCHEDULING USING SOFTWARE-CONTROLLED INTERVAL COMPUTATION

RELATED APPLICATIONS

The present invention is related to the inventions described in U.S. patent application Ser. No. 10/085,219 entitled "Processor With Dynamic Table-Based Scheduling Using Linked Transmission Elements For Handling Transmission Request Collisions," U.S. patent application Ser. No. 10/085,223 entitled "Processor With Dynamic Table-Based Scheduling Using Multi-Entry Table Locations For Handling Transmission Request Collisions," and U.S. patent application Ser. No. 10/085,771 entitled "Processor With Software-Controlled Programmable Service Levels," all filed concurrently herewith and hereby incorporated by reference herein.

FIELD OF THE INVENTION

The present invention relates generally to techniques for transmitting packets or other blocks of data through a network, and more particularly to a network processor or other type of processor configured for use in performing operations such as routing or switching of such data blocks.

BACKGROUND OF THE INVENTION

A network processor generally controls the flow of data between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

An important function of a network processor involves the scheduling of packets or other data blocks for transmission, e.g., for transmission to the switch fabric from the network or vice versa. A network processor typically includes a scheduler for implementing this function. One way that such a scheduler may be implemented involves the use of demand-based time slot tables, also referred to as dynamic time slot tables. In these cases, a significant problem that can arise relates to the manner in which the scheduler deals with transmission request collisions, that is, simultaneous requests for transmission in the same time slot. Typically, only a single block of data can be transmitted in a given time slot. When multiple data blocks request transmission in the same time slot, only one of the blocks can be transmitted, and the other blocks must be delayed or dropped. It should be noted that this problem is specific to demand-based time slot tables, and is generally not an issue for static time slot tables which can be configured to avoid collisions altogether.

The above-noted problem with demand-based time slot tables makes it difficult to maintain a desired traffic shaping for the transmitted data blocks in the corresponding network processor. This in turn complicates the provision of desired service levels, e.g., specified quality of service (QoS) or class of service (CoS) levels, for particular network connections supported by the network processor.

Another problem with conventional network processors is that the particular scheduling algorithm used is generally not selectable under software control. Most conventional network processor schedulers perform traffic shaping in accordance with a designated scheduling algorithm through specific hardware configuration. An example of this type of scheduler is a hardware-based generic cell rate algorithm (GCRA) scheduler with configurable leaky bucket depths, more particularly known as a t-GCRA scheduler. In this example, the basic hardware-based GCRA scheduling algorithm cannot be altered so as to allow the processor to implement another type of scheduling algorithm. As a result, the corresponding network processor is unduly inflexible, and may be suitable for use only in particular scheduling applications.

A need therefore exists for improved scheduling techniques for use in a network processor, so as to facilitate the provision of QoS, CoS or other desired service levels for corresponding network connections.

SUMMARY OF THE INVENTION

The invention provides improved techniques for scheduling data blocks for transmission in a network processor or other type of processor.

In accordance with one aspect of the invention, a processor includes scheduling circuitry and an associated interval computation element. The scheduling circuitry schedules data blocks for transmission from a plurality of transmission elements, and is configured for utilization of at least one time slot table in scheduling the data blocks for transmission. The interval computation element is operative to determine an interval for transmission of one or more data blocks associated with corresponding locations in the time slot table. The transmission interval is adjustable under control of the interval computation element so as to facilitate the maintenance of a desired service level for one or more of the transmission elements. The interval computation element operates under software control in at least one of determining and adjusting the transmission interval, and may be operative to determine periodically if the transmission interval requires adjustment in order to maintain the desired service level for one or more of the transmission elements.

In an illustrative embodiment of the invention, the interval computation element is implemented as a script processor in traffic shaping circuitry that is coupled to the scheduling circuitry via transmit queue circuitry.

Advantageously, the techniques of the invention provide a network processor with the ability to implement different scheduling algorithms under software control, thereby substantially improving processor flexibility, and facilitating the provision of QoS or CoS for network connections. Another advantage of the software-controlled interval computation of the invention is that it can be configured to operate "out of band," i.e., the interval computation may be performed after the transmission or scheduling for transmission of a given data block, so as not to delay the transmission of that data block.

DETAILED DESCRIPTION OF THE INVENTION

The invention will be illustrated herein in conjunction with an exemplary system for processing data for transmission through a network. The exemplary system includes a network processor configured in a particular manner in order to illustrate the techniques of the invention. It should be understood, however, that the invention is more generally applicable to any processor in which it is desirable to provide improved table-based scheduling operations.

A "processor" as the term is used herein may be implemented, by way of example and without limitation, utilizing elements such as those commonly associated with a microprocessor, central processing unit (CPU), digital signal processor (DSP), application-specific integrated circuit (ASIC), or other type of data processing device, as well as portions and combinations of such elements.

The present invention in an illustrative embodiment improves scheduling operations in a network processor or other processor through the use of a table-based scheduling technique which includes software-controlled computation of transmission interval. Advantageously, the software-controlled computation of transmission interval facilitates the maintenance of a desired traffic shaping for the transmitted data blocks, and thus a desired service level.

Although illustrated herein in conjunction with dynamic table-based scheduling, the invention does not require the use of dynamic table-based scheduling, and can be implemented using other types of table-based scheduling, e.g., static table-based scheduling.

It should be noted that the scheduling techniques of the present invention may be used in conjunction with the collision handling and programmable service level techniques described in the above-cited U.S. Patent Applications filed concurrently herewith.

Figure 1:
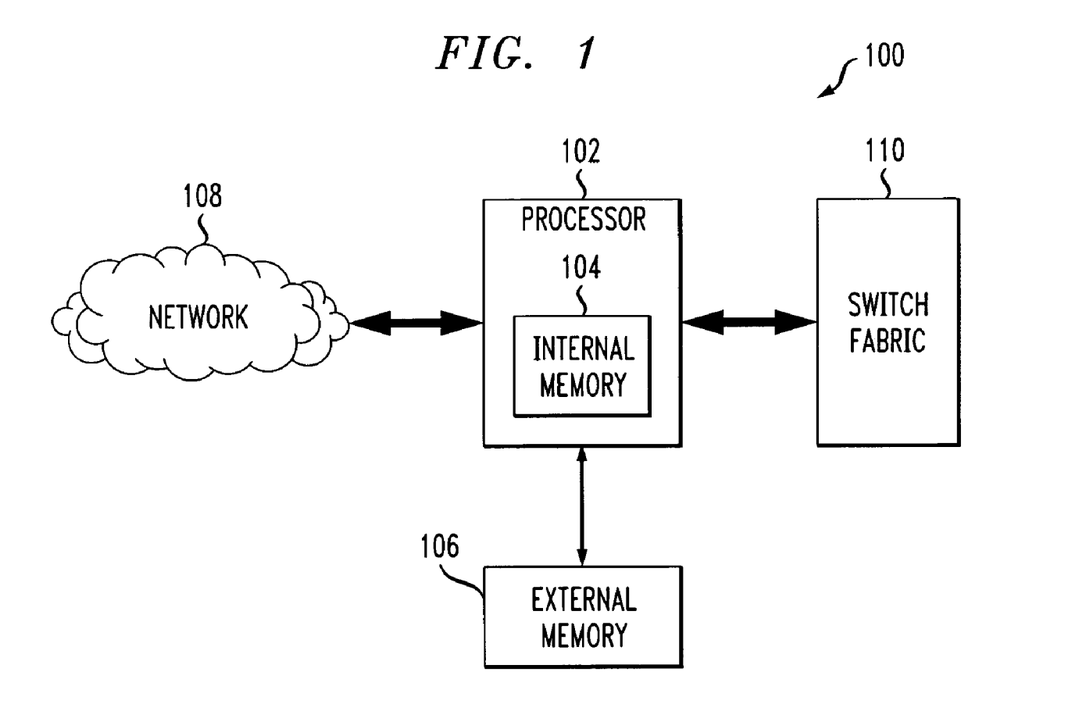
FIG. 1 is a simplified block diagram of an illustrative embodiment of a processing system in which the present invention is implemented.

FIG. 1 shows a network processing system 100 in which the invention is implemented. The system 100 includes a network processor 102 having an internal memory 104. The network processor 102 is coupled to an external memory 106 as shown, and is configured to provide an interface for communicating cells, packets, protocol data units (PDUs) or other arrangements of data between a network 108 and a switch fabric 110. All such arrangements of data are intended to be encompassed by the general term "data block" as used herein. The processor 102 and its associated external memory 106 may be implemented, e.g., as one or more integrated circuits installed on a line card or port card of a router or switch. In such a configuration, the switch fabric 110 is generally considered to be a part of the router or switch.

Figure 2:
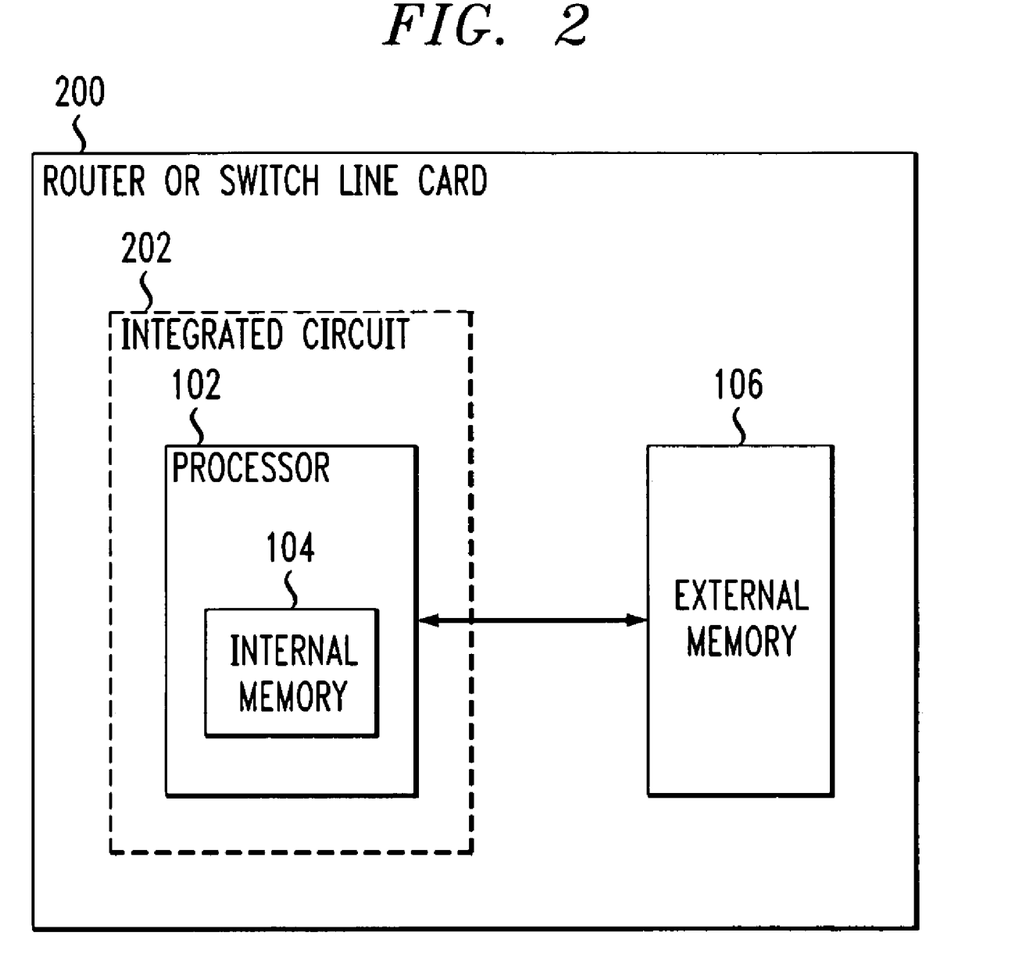
FIG. 2 illustrates one possible implementation of a network processor of the FIG. 1 system as an integrated circuit installed on a line card of a router or switch.

FIG. 2 illustrates an example router or switch line card embodiment of a portion of the system 100 of FIG. 1. In this embodiment, the processing system comprises a line card 200 having at least one integrated circuit 202 installed thereon. The integrated circuit 202 comprises network processor 102 which has internal memory 104. The network processor 102 interacts with external memory 106 on the line card 200. The external memory 106 may serve, e.g., as an external static random access memory (SRAM) or dynamic random access memory (DRAM) for the network processor integrated circuit 202. Such memories may be configured in a conventional manner. A suitable host processor may also be installed on the line card 200, and used for programming and otherwise controlling the operation of one or more network processor integrated circuits on the line card 200.

The portion of the processing system as shown in FIGS. 1 and 2 is considerably simplified for clarity of illustration. It is to be appreciated, however, that the processing system may comprise a router or switch which includes multiple line cards such as that shown in FIG. 2, and that each of the line cards may include multiple integrated circuits. A similar embodiment may be implemented in the form of a port card.

It should also be understood that the particular arrangements of system elements shown in FIGS. 1 and 2 are by way of illustrative example only. More specifically, as previously noted, the invention can be implemented in any type of processor, and is not limited to any particular network-based processing application.

Figure 3:
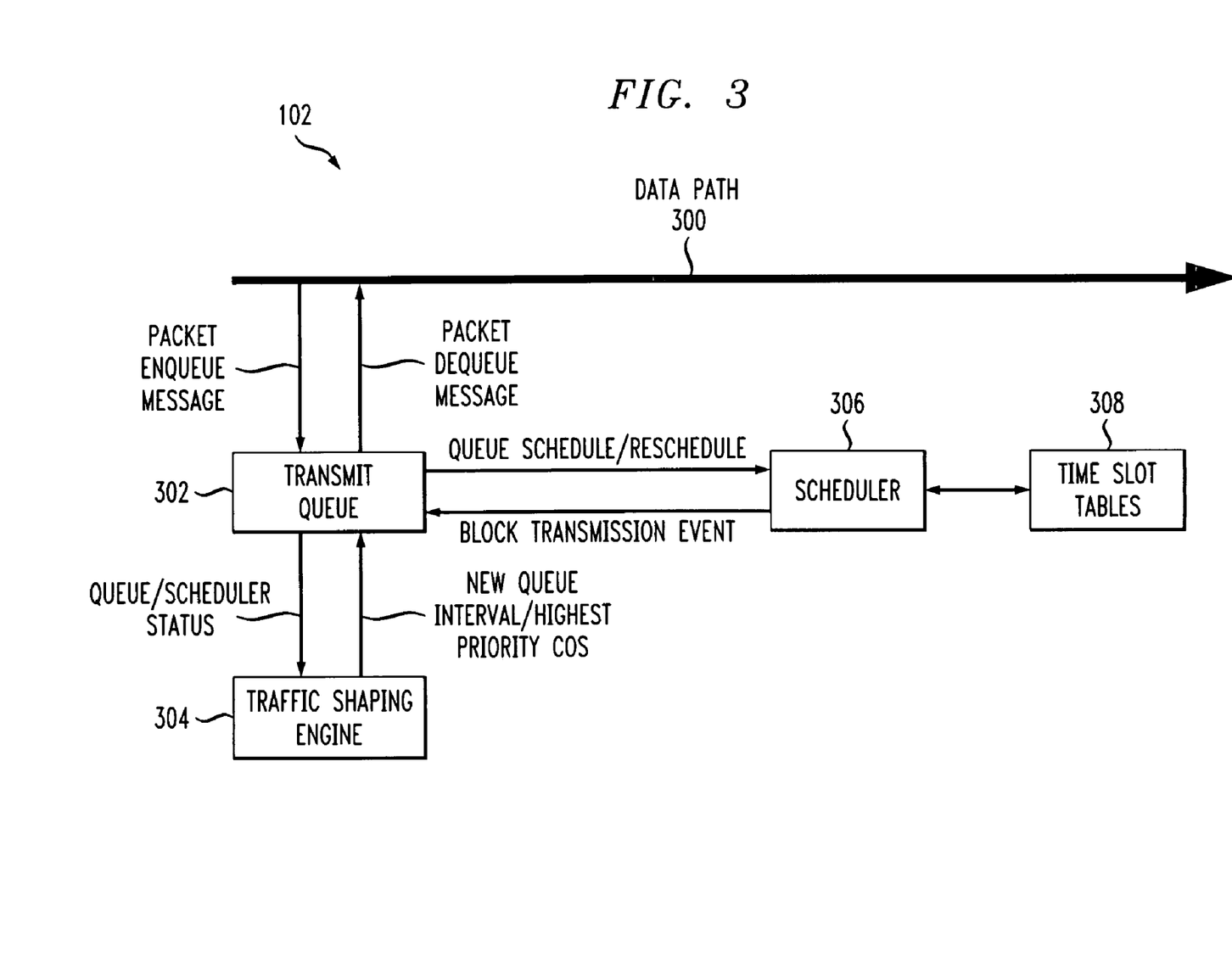
FIG. 3 is a more detailed view of a network processor of the FIG. 1 system configured in accordance with the techniques of the invention.

FIG. 3 shows a more detailed view of the network processor 102 in the illustrative embodiment of the invention. The network processor 102 in this embodiment includes a data path 300, a transmit queue 302, a traffic shaping engine 304, a scheduler 306, and a set of time slot tables 308.

The data path 300 may represent one or more processing elements which collectively provide a path for data blocks in passing through the processor 102. Such data path elements may be configured in a conventional manner well understood by those skilled in the art, and are therefore not described in further detail herein.

The transmit queue 302 preferably has a plurality of transmission elements associated therewith. For example, the transmit queue 302 may comprise a plurality of transmission queues and associated control logic, with each of the transmission queues corresponding to a transmission element. It should be noted, however, that the term "transmission element" as used herein is intended to be construed more generally so as to encompass any source of one or more data blocks that are to be scheduled for transmission in the network processor 102.

The transmit queue 302 in this embodiment is coupled to the traffic shaping engine 304 and to the scheduler 306, and provides an interface between these elements and the data path 300. In general, the transmit queue 302 supplies time slot requests from transmission elements associated therewith to the scheduler 306 in accordance with one or more traffic shaping requirements established by the traffic shaping engine 304 for the transmission of the data blocks from the transmission elements of the transmit queue 302.

Packets or other data blocks can be enqueued in transmission elements of the transmit queue 302 from the data path 300, e.g., in conjunction with packet enqueue messages and associated data blocks received from the data path 300. Similarly, packets or other data blocks can be dequeued from the transmission elements to the data path 300 upon transmission, e.g., in conjunction with packet dequeue messages and associated data blocks sent to the data path 300.

The traffic shaping engine 304 is coupled to the scheduler 306 via the transmit queue 302, and establishes the traffic shaping requirements in the illustrative embodiment. As is shown in the figure, the traffic shaping engine 304 receives information regarding queue and scheduler status from the transmit queue 302, and generates traffic shaping information that is returned to the transmit queue 302. This information may include information such as queue transmission interval and prioritization for establishing a class of service (CoS) or other desired service level for one or more of the transmission elements or their corresponding network connections. The term "traffic shaping requirement" as used herein is intended to include without limitation information that at least partially specifies a service level for one or more of the transmission elements or their corresponding network connections, e.g., a desired transmission rate, transmission interval, transmission order or prioritization for one or more of the transmission elements. The traffic shaping engine 304 is an example of an element referred to more generally herein as "traffic shaping circuitry." In other embodiments, traffic shaping circuitry may be configured to include, in addition to the traffic shaping engine 304, one or more elements or functions of the transmit queue 302, or other arrangements of circuitry capable of establishing traffic shaping requirements, as will be readily apparent to those skilled in the art.

The scheduler 306 is responsible for scheduling data blocks for transmission from the queues or other transmission elements of the transmit queue 302. In accordance with techniques described in one or more of the above-cited U.S. Patent Applications, the scheduler 306 may utilize one or more of the time slot tables 308 to schedule the data blocks for transmission in a manner that substantially maintains the traffic shaping requirement established by the traffic shaping engine 304 in the presence of collisions between requests from the transmission elements for each of one or more of the time slots.

As shown in the figure, the scheduler 306 receives transmission requests, e.g., in the form of queue schedule or reschedule commands, from the transmit queue 302, and processes these requests in accordance with information stored in the time slot tables 308 to generate block transmission event commands that are returned to the transmit queue 302.

It should be emphasized that the particular information shown in FIG. 3 as being communicated between the elements 300, 302, 304 and 306 thereof is by way of example only, and not intended to limit the scope of the invention in any way. Those skilled in the art will recognize that other messages, commands or information transfer configurations may be used.

The scheduler 306 is an example of an element referred to more generally herein as "scheduling circuitry." In other embodiments, scheduling circuitry may include in addition to the scheduler 306 one or more of the time slot tables 308, one or more elements or functions of the transmit queue 302, or other arrangements of circuitry capable of implementing the scheduling techniques of the present invention. Thus, although shown as separate from the scheduler 306 in the figure, the time slot tables 308 or suitable portions thereof may be incorporated into scheduling circuitry in accordance with the invention.

The time slot tables 308 may be stored at least in part in the internal memory 104 of the network processor 102, and may also or alternatively be stored at least in part in the external memory 106 of the network processor 102.

A given one of the time slot tables 308 includes a plurality of locations, each corresponding generally to a transmission time slot. More particularly, each location in the table preferably corresponds to a single entry in memory which maps directly to a transmission time slot. Each of the locations is preferably configured for storing an identifier of one of the transmission elements from transmit queue 302 that has requested transmission of a block of data in the corresponding time slot. A time slot may be viewed as the amount of absolute time it takes to transmit a single block of data over an interface or other network connection supported by the network processor 102. Each of the tables in the set of tables 308 may be associated with a particular interface or other network connection. It is to be appreciated that the invention does not require any particular size or configuration of data blocks.

The scheduler 306 provides dynamic maintenance of the time slot tables 308, such that identifiers of requesting transmission elements are entered into table locations on a demand basis. That is, as the transmission elements have data blocks to transmit, their identifiers are entered into the appropriate table locations. If a transmission element has no data block to transmit, then its identifier is not entered into the table.

Figure 4:
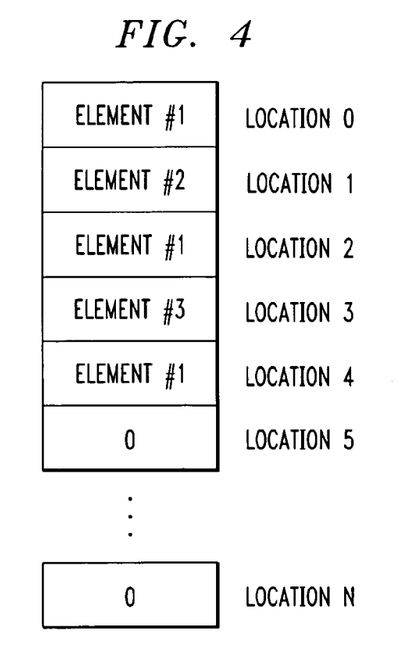
FIG. 4 shows an illustrative time slot table utilizable in a scheduling operation of the FIG. 3 processor in accordance with the invention.

FIG. 4 shows an example of one of the time slot tables 308. The table includes N+1 locations denoted Location 0, Location 1, ... Location N. Each of the locations is capable of storing an identifier of a transmission element. The state of the table represents the manner in which data blocks will be transmitted out over a particular interface or other network connection supported by the network processor 102. For example, assume that N=5, such that there are a total of six locations in the table, and that these six locations have entries as shown in the figure. An entry of "0" indicates that there is no transmission element identifier stored in the corresponding location. Locations 0, 2 and 4 each have the identifier of an Element #1 stored therein, while locations 1 and 3 have the identifiers of Element #2 and Element #3, respectively, stored therein.

As a result of this example storage of transmission element identifiers, Element #1 will receive exactly one-half of the bandwidth of the network connection with a delay variation of zero, while Element #2 and Element #3 will each receive one-sixth of the bandwidth of the network connection. It can therefore be seen that the manner in which the table is populated with transmission element identifiers will determine the transmission bandwidth assigned to each of the transmission elements. This assignment is made in accordance with one or more traffic shaping requirements established by the traffic shaping engine 304 and communicated to the scheduler 306 via the transmit queue 302.

The assignment of transmission element identifiers to table locations also determines the relative "clumping" or burstiness of the transmission elements, also referred to herein as delay variation. In the FIG. 4 example, each of Element #1, Element #2 and Element #3 will have a delay variation of zero.

In a demand-based scheduling arrangement such as that illustrated in conjunction with FIGS. 3 and 4, there may be collisions between transmission elements that request the same time slot for transmission. As indicated previously, the present invention can utilize the collision handling techniques described in one or more of the above-cited U.S. Patent Applications.

It should be understood that the present invention does not require the particular time slot table configuration shown in FIG. 4, and can use other time slot configurations, including alternative configurations described in one or more of the above-cited U.S. Patent Applications, as will be apparent to those skilled in the art.

The network processor 102 through the use of the above-described time slot table mechanism has the ability to control the transmission rates of individual transmission elements. In the illustrative embodiments of the invention, in which the tables are used in a dynamic rather than static manner, the transmission interval generally defines the rate at which a transmission element is permitted to transmit from the time slot table. The network processor 102 is configured such that the transmission interval and thus the corresponding rate can be varied under software control via an interval computation element. The interval is preferably static in the absence of modification via the interval computation element.

As will be described in greater detail below, the transmission interval is utilized by the network processor 102 in scheduling transmission element requests using a corresponding time slot table. The interval is thus used for both initial scheduling events and rescheduling events, i.e., a subsequent scheduling for a transmission element that has already transmitted or been scheduled to transmit a data block.

Figure 5:
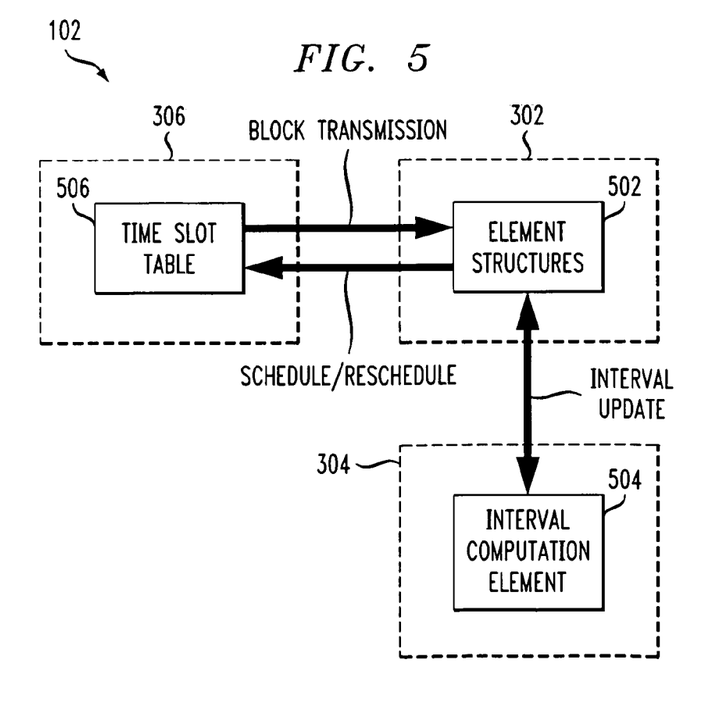
FIG. 5 shows a simplified block diagram of a portion of the FIG. 3 network processor including an interval computation element in accordance with the invention.

FIG. 5 is a diagram of an embodiment of the network processor 102 that will be used to illustrate the software-controlled interval computation aspects of the invention. The network processor 102 in this embodiment includes transmit queue 302, traffic shaping engine 304 and scheduler 306 configured substantially in the manner previously described.

The transmit queue 302 includes a number of element structures 502, which may be transmission queues or other transmission elements for which data blocks are to be scheduled for transmission by the scheduler 306.

The traffic shaping engine 304 includes an interval computation element 504 that interfaces with the traffic queue 302 and provides updated interval information thereto. The operation of the interval computation element 504 and its interaction with other elements of the network processor 102 such as transmit queue 302 and scheduler 306 will be described in greater detail in conjunction with the flow diagram of FIG. 6.

The scheduler 306 in this embodiment is configured to include at least one time slot table 506, which may correspond to one or more of the time slot tables 308 of FIG. 3. The time slot tables 308 may thus be partially or wholly incorporated into the scheduler 306, as was indicated above.

Also as described previously, the transmit queue 302 supplies time slot requests from the transmission element structures to the scheduler 306 in accordance with a traffic shaping requirement established by the traffic shaping engine 304.

The interval computation element 504 may be implemented, e.g., at least in part as a compute engine or other script processor which operates under software control to provide at least one of transmission interval determination and adjustment in accordance with the invention. As another example, the interval computation element may be implemented as a particular instance or configuration of a specialized processor within the network processor 102, the particular instance or configuration being dedicated to the computation of the transmission interval.

The interval computation element 504 is associated with the scheduler 306 in this embodiment by virtue of its being coupled thereto via the transmit queue 302. Other associations between the interval computation element 504 and the scheduler 306 may be used in alternative embodiments of the invention, e.g., the interval computation element 504 may be incorporated into the scheduler 306, or coupled thereto using other coupling arrangements.

In operation, the interval computation element 504 determines an interval for transmission of one or more data blocks associated with corresponding locations in the time slot table. The transmission interval is thus adjustable under control of the interval computation element 504, in accordance with one or more scripts or other software programs, so as to facilitate the maintenance of a desired service level for one or more of the transmission elements. The transmission interval may specify a rate at which data blocks associated with corresponding locations in the time slot table are transmitted.

The interval computation element 504 is further operative to determine periodically if the transmission interval requires adjustment in order to maintain the desired service level for one or more of the transmission elements. The interval computation element generally makes a determination as to whether the transmission interval requires adjustment after transmission of a specified number of the data blocks, e.g., after transmission of each of the data blocks, every two data blocks, etc.

In accordance with the invention, the interval computation element 504 may select or otherwise determine an appropriate transmission interval based on a determination of a particular scheduling algorithm to be utilized in the network processor 102. For example, the interval computation element may be operative to select the transmission interval from at least a first transmission interval associated with a first scheduling algorithm and a second transmission interval associated with a second scheduling algorithm.

The software-controlled interval computation of the present invention thus can facilitate the implementation of different scheduling algorithms in the network processor, thereby considerably improving the flexibility of the processor relative to conventional processors which are hard-wired to implement particular scheduling algorithms. The programmability in the illustrative embodiment comes from the fact that the network processor can run any scheduling algorithm with software control properly compiled for the structure of the interval computation element 504.

Another advantage of the software-controlled interval computation in the illustrative embodiment of the invention is that it operates "out of band," i.e., the computation may be performed after the transmission or scheduling for transmission of a given data block, and thus does not delay the transmission of that data block.

Figure 6:
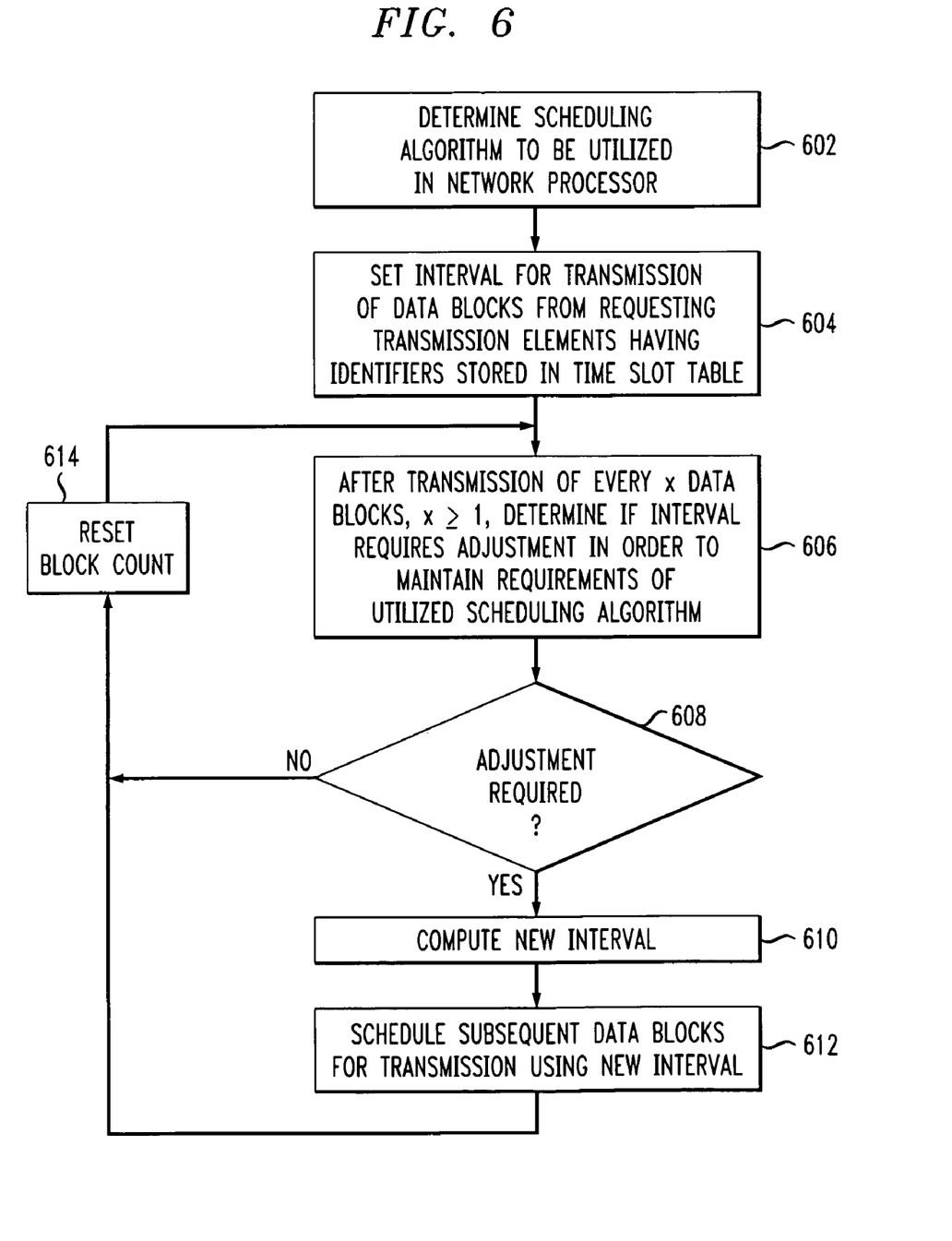
FIG. 6 is a flow diagram illustrating a software-controlled interval computation process in accordance with the invention.

FIG. 6 shows a flow diagram of an exemplary software-controlled interval computation process that may be implemented in the network processor 102 in accordance with the present invention. In step 602, a determination is made as to the particular scheduling algorithm to be utilized in the network processor. Advantageously, the use of software-controlled interval computation allows a number of different scheduling algorithms to be implemented in the network processor. Examples of such algorithms include the generic cell rate algorithm (GCRA), guaranteed frame rate (GFR) algorithm, resource reservation protocol (RSVP), etc. The invention does not require any particular scheduling algorithm, but instead provides the flexibility to allow a given network processor with dynamic table-based scheduling to be utilized to implement multiple such algorithms. The same network processor can thus be implemented in a wide variety of different networking applications, through appropriate software control.

Step 604 of FIG. 6 indicates that an interval is set for transmission of data blocks from requesting transmission elements having identifiers stored in the time slot table. In general, a different interval may be set for each time slot table in the network processor. Other arrangements are also possible, including separate establishment of transmission intervals for individual transmission elements or for groups of such elements.

In steps 606 and 608, after the transmission of a given number x of data blocks, a determination is made as to whether an adjustment of the interval set in step 604 will be needed in order to maintain the requirements of the particular scheduling algorithm being utilized. The number x is greater than or equal to one, and may be selected based at least in part on latency issues to be further described below. If the determination indicates that an adjustment is not required, the process returns to step 606 via step 614 to make another determination after the transmission of another x data blocks. If the determination indicates that an adjustment is required, a new interval is computed by the interval computation element 504 in step 610. Step 612 then indicates that subsequent data blocks are scheduled for transmission using the new transmission interval, and the process returns to step 606 via step 614. Step 614 resets the block count after each adjustment determination such that each time the process re-enters step 606 the count of data blocks which triggers the adjustment determination after x data blocks is restarted.

The number of blocks x after which the adjustment determination is triggered may also be made under software control, e.g., in response to instructions in one or more scripts or other software programs.

The computation of the transmission interval as described in conjunction with step 610 of FIG. 6 may be implemented in a straightforward manner using information such as transmission rate or other types of traffic shaping information described herein, as will be apparent to those skilled in the art. The particular computation techniques used may vary depending on the selected scheduling algorithm, and are not a requirement of the invention.

The scheduler 306 in the network processor 102 utilizes the computed transmission interval to assign requesting transmission elements to locations in the time slot table. For example, the scheduler may assign a given requesting transmission element to a location in the time slot table in accordance with the following equation:

Assigned Time Slot=Current Time+Interval, where Current Time denotes a time corresponding to a current transmission time slot, i.e., an actual transmission time for a given data block, and Interval denotes the transmission interval as computed by the interval computation element 504. This particular equation is shown by way of example only, as one possible equation suitable for use with the time slot table configuration of FIG. 4, and the invention may be configured to utilize other scheduling equations.

The foregoing equation may be used for both initial scheduling of a transmission element and rescheduling of a transmission element. The latter situation can arise, e.g., when a given transmission element must transmit multiple data blocks in order to transmit a complete packet or PDU. A rescheduling event, as indicated previously, thus involves a subsequent scheduling for a transmission element that has already transmitted or been scheduled to transmit a data block. In the case of such a rescheduling event, the interval computation element 504 may be called with the relevant information for the corresponding transmission element. A script or other program running on this element may then determine whether to modify the interval or to leave the interval at its current value. If a decision is made to change the interval, the new value will be reflected in the next rescheduling event. As indicated above, this "out of band" operation provides significant advantages in terms of reducing latency.

It should also be noted that the above equation ensures that a given requesting transmission element will not be assigned a time slot such that the actual service level exceeds the desired service level in the case in the case where the desired transmission interval is slower than a corresponding request arrival rate. It can, however, cause the transmission element to receive less than the desired service level in some circumstances. For example, the value of x in FIG. 6 represents a latency in the transmission interval adjustment, i.e., there are a total of x transmission events that have been passed by the time the transmission interval has been adjusted by the software-controlled interval computation process. In other words, there may be several transmission events that have already occurred by the time the interval computation result has been made available to the scheduling circuitry. This latency should be taken into account in selecting x and in the particular configuration of the software for implementing a given scheduling algorithm in the network processor.

The above-described embodiments of the invention are intended to be illustrative only. For example, although the illustrative embodiment of FIG. 3 utilizes a scheduler which is separate from its associated time slot tables, these tables or portions thereof may be incorporated into scheduling circuitry in accordance with the invention. Similarly, although a separate transmit queue having multiple transmission elements is described in conjunction with the FIG. 3 embodiment, the associated functionality may be distributed across scheduling circuitry and traffic shaping circuitry in accordance with the invention. Other embodiments can use different types and arrangements of processing elements for implementing the described functionality. These and numerous other alternative embodiments within the scope of the following claims will be apparent to those skilled in the art.

What is claimed is:

1. A processor comprising:
   scheduling circuitry for scheduling data blocks for transmission from a plurality of transmission elements, the scheduling circuitry being configurable for utilization of at least one time slot table in scheduling the data blocks for transmission; and
   an interval computation element associated with the scheduling circuitry and operative to determine an interval for transmission of one or more data blocks associated with corresponding locations in the time slot table, a particular location in the time slot table being assigned to one or more of the transmission elements as a function of both a current time and the transmission interval, the transmission interval being adjustable under control of the interval computation element so as to facilitate maintenance of a desired service level for one or more of the transmission elements;
   wherein the scheduling circuitry comprises a hardware-implemented scheduler;
   wherein the interval computation element comprises a software-implemented element external to the hardware-implemented scheduler; and
   wherein adjustment of the transmission interval by the interval computation element allows the hardware-implemented scheduler to support at least one scheduling algorithm not otherwise supported by the hardware-implemented scheduler alone.

2. The processor of claim 1 wherein the interval computation element operates under software control in at least one of determining and adjusting the transmission interval.

3. The processor of claim 1 wherein the interval computation element comprises a script processor.

4. The processor of claim 1 wherein the interval computation element is operative to determine periodically if the transmission interval requires adjustment in order to maintain the desired service level for one or more of the transmission elements.

5. The processor of claim 4 wherein the interval computation element makes a determination as to whether the transmission interval requires adjustment, after transmission of a specified number of the data blocks.

6. The processor of claim 5 wherein the interval computation element makes the determination as to whether the transmission interval requires adjustment after transmission of each of the data blocks.

7. The processor of claim 1 wherein the transmission interval specifies a rate at which data blocks associated with corresponding locations in the time slot table are transmitted.

8. The processor of claim 1 wherein the interval computation element is operative to select the transmission interval from at least a first transmission interval associated with a first scheduling algorithm and a second transmission interval associated with a second scheduling algorithm.

9. The processor of claim 1 wherein a given requesting transmission element is assigned to a location in the time slot table in accordance with the following equation:

Assigned Time Slot=Current Time+Interval, where Current Time denotes a time corresponding to a current transmission time slot and Interval denotes the transmission interval.

10. The processor of claim 1 wherein the scheduling circuitry comprises the time slot table.

11. The processor of claim 1 further comprising traffic shaping circuitry coupled to the scheduling circuitry, the traffic shaping circuitry comprising the interval computation element.

12. The processor of claim 11 further comprising transmit queue circuitry coupled to the scheduling circuitry, wherein the transmission elements comprise one or more queues associated with the transmit queue circuitry, the transmit queue circuitry supplying time slot requests from the transmission elements to the scheduling circuitry in accordance with a traffic shaping requirement established by the traffic shaping circuitry.

13. The processor of claim 1 wherein the time slot table is stored at least in part in an internal memory of the processor.

14. The processor of claim 1 wherein the time slot table is stored at least in part in an external memory coupled to the processor.

15. The processor of claim 1 wherein one or more of the data blocks comprise data packets.

16. The processor of claim 1 wherein the scheduling circuitry provides dynamic maintenance of the time slot table such that identifiers of requesting transmission elements are entered into the table locations on a demand basis.

17. The processor of claim 16 wherein the identifiers of the transmission elements comprise a structure having one or more bits for allowing a given one of the transmission element identifiers to be linked to another of the transmission element identifiers.

18. The processor of claim 1 wherein the processor comprises a network processor configured to provide an interface for data block transfer between a network and a switch fabric.

19. The processor of claim 1 wherein the processor is configured as an integrated circuit.

20. A method for use in a processor, the method comprising:

scheduling data blocks for transmission from a plurality of transmission elements;

wherein the scheduling step utilizes at least one time slot table to schedule the data blocks for transmission in accordance with a determined interval for transmission of one or more data blocks associated with corresponding locations in the time slot table, a particular location in the time slot table being assigned to one or more of the transmission elements as a function of both a current time and the transmission interval, the transmission interval being adjustable so as to facilitate maintenance of a desired service level for one or more of the transmission elements;

wherein the scheduling step is performed in a hardware-implemented scheduler;

wherein the transmission interval is determined in a software-implemented interval computation element external to the hardware-implemented scheduler; and wherein adjustment of the transmission interval by the interval computation element allows the hardware-implemented scheduler to support at least one scheduling algorithm not otherwise supported by the hardware-implemented scheduler alone.

21. An article of manufacture comprising a machine-readable storage medium for use in conjunction with a processor, the medium storing one or more software programs for use in scheduling data blocks for transmission from a plurality of transmission elements utilizing at least one time slot table, the one or more programs when executed providing at least one of determination of an interval for transmission of one or more data blocks associated with corresponding locations in the time slot table, a particular location in the time slot table being assigned to one or more of the transmission elements as a function of both a current time and the transmission interval, and adjustment of the interval so as to facilitate maintenance of a desired service level for one or more of the transmission elements;

wherein the scheduling is performed in a hardware-implemented scheduler;

wherein the transmission interval is determined in a software-implemented interval computation element external to the hardware-implemented scheduler; and wherein adjustment of the transmission interval by the interval computation element allows the hardware-implemented scheduler to support at least one scheduling algorithm not otherwise supported by the hardware-implemented scheduler alone.

* * * * *